(12) United States Patent
Kim et al.

(10) Patent No.: US 10,637,624 B2
(45) Date of Patent: Apr. 28, 2020

(54) METHOD FOR INDICATING QCL INFORMATION FOR APERIODIC CSI-RS IN WIRELESS COMMUNICATION SYSTEM AND APPARATUS FOR SAME

(71) Applicant: LG ELECTRONICS INC., Seoul (KR)

(72) Inventors: Hyungtae Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/323,243

(22) PCT Filed: Aug. 11, 2017

(86) PCT No.: PCT/KR2017/008765
§ 371 (c)(1),
(2) Date: Feb. 4, 2019

(87) PCT Pub. No.: WO2018/030849
PCT Pub. Date: Feb. 15, 2018

(65) Prior Publication Data
US 2019/0190672 A1 Jun. 20, 2019

Related U.S. Application Data

(60) Provisional application No. 62/373,971, filed on Aug. 11, 2016, provisional application No. 62/376,414, (Continued)

(51) Int. Cl.
*H04W 4/00* (2018.01)
*H04L 5/00* (2006.01)
(Continued)

(52) U.S. Cl.
CPC ......... *H04L 5/0048* (2013.01); *H04B 7/0456* (2013.01); *H04L 1/00* (2013.01);
(Continued)

(58) Field of Classification Search
None
See application file for complete search history.

(56) References Cited

U.S. PATENT DOCUMENTS

2013/0279437 A1* 10/2013 Ng .................. H04W 48/12
370/329
2014/0092827 A1 4/2014 Jongren et al.
(Continued)

FOREIGN PATENT DOCUMENTS

KR 1020160055086 5/2016

OTHER PUBLICATIONS

PCT International Application No. PCT/KR2017/008765, Written Opinion of the International Searching Authority dated Nov. 20, 2017, 22 pages.
(Continued)

*Primary Examiner* — Clemence S Han
(74) *Attorney, Agent, or Firm* — Lee, Hong, Degerman, Kang & Waimey

(57) ABSTRACT

Disclosed herein is a method for receiving a user equipment-specific reference signal-based data signal by a user equipment in a wireless communication system. Particularly, the method comprises the steps of: receiving a control signal for the user equipment-specific reference signal-based data signal from an eNodeB; and receiving the user equipment-specific reference signal-based data signal on the basis of the control signal, wherein the control signal includes information on an antenna port for a channel status information-reference signal, the antenna port being assumed to be quasi-co-located (QCL) with an antenna port for the user
(Continued)

equipment-specific reference signal, and the channel status information-reference signal excludes an aperiodic channel status information-reference signal.

16 Claims, 8 Drawing Sheets

Related U.S. Application Data filed on Aug. 18, 2016, provisional application No. 62/422,582, filed on Nov. 15, 2016, provisional application No. 62/423,739, filed on Nov. 17, 2016.

(51) Int. Cl.
*H04L 1/00* (2006.01)
*H04B 7/0456* (2017.01)
*H04W 72/04* (2009.01)
*H04B 7/024* (2017.01)
*H04W 88/02* (2009.01)

(52) U.S. Cl.
CPC ........... *H04L 5/00* (2013.01); *H04W 72/0406* (2013.01); *H04B 7/024* (2013.01); *H04W 88/02* (2013.01)

(56) References Cited

U.S. PATENT DOCUMENTS

| | | | |
|---|---|---|---|
| 2014/0119266 A1* | 5/2014 | Ng | H04L 1/0061 370/312 |
| 2014/0254516 A1* | 9/2014 | Lee | H04J 11/0023 370/329 |
| 2015/0016369 A1* | 1/2015 | Park | H04B 7/024 370/329 |
| 2015/0023265 A1* | 1/2015 | Park | H04B 7/024 370/329 |
| 2015/0029966 A1 | 1/2015 | Park et al. | |
| 2015/0207600 A1 | 7/2015 | Park et al. | |
| 2017/0086153 A1* | 3/2017 | Yoon | H04W 56/001 |
| 2017/0093538 A1* | 3/2017 | Yoon | H04B 7/0626 |
| 2018/0302195 A1* | 10/2018 | Kim | H04L 1/18 |

OTHER PUBLICATIONS

Zte, et al., "QCL Issues of Joint Transmission", 3GPP TSG RAN WG1 Meeting #85, R1-164303, May 2016, 5 pages.

* cited by examiner (a) Control-plane protocol stack (b) User-plane protocol stack

METHOD FOR INDICATING QCL INFORMATION FOR APERIODIC CSI-RS IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2017/008765, filed on Aug. 11, 2017, which claims the benefit of U.S. Provisional Application Nos. 62/373,971, filed on Aug. 11, 2016, 62/376,414, filed on Aug. 18, 2016, 62/422,582, filed on Nov. 15, 2016, and 62/423,739, filed on Nov. 17, 2016, the contents of which are all hereby incorporated by reference herein in their entirety.

TECHNICAL FIELD

The present disclosure relates to a wireless communication system, and more particularly, to a method for indicating QCL (Quasi Co-Location) information for aperiodic CSI-RS (Channel Status Information-Reference Signal) in wireless communication system and a device for performing the method.

BACKGROUND

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Purpose

Based on the above discussion, the present disclosure proposes a method for indicating QCL (Quasi Co-Location) information for aperiodic CSI-RS (Channel Status Information-Reference Signal) in wireless communication system and a device for performing the method.

Technical Solution

In one aspect of the present disclosure, there is provided a method for receiving a user equipment-specific reference signal-based data signal by a user equipment in a wireless communication system, the method comprising: receiving a control signal for the user equipment-specific reference signal-based data signal from a base station; and receiving the user equipment-specific reference signal-based data signal based on the control signal, wherein the control signal includes information about an antenna port for a channel state information reference signal assumed to be quasi co-located (QCLed) with an antenna port for the user equipment-specific reference signal, wherein the channel state information reference signal excludes an aperiodic channel state information reference signal.

In another aspect of the present disclosure, there is provided an user equipment (UE) in a wireless communication system, the UE comprising: a wireless communication module; and a processor coupled to the module, wherein the processor is configured for: receiving a control signal for the user equipment-specific reference signal-based data signal from a base station; and receiving the user equipment-specific reference signal-based data signal based on the control signal, wherein the control signal includes information about an antenna port for a channel state information reference signal assumed to be quasi co-located (QCLed) with an antenna port for the user equipment-specific reference signal, wherein the channel state information reference signal excludes an aperiodic channel state information reference signal.

In still another aspect of the present disclosure, there is provided a method for receiving a user equipment-specific reference signal-based data signal by a user equipment in a wireless communication system, the method comprising: receiving a control signal for the user equipment-specific reference signal-based data signal from a base station, wherein the control signal includes information about an antenna port for a channel state information reference signal; and receiving the user equipment-specific reference signal-based data signal based on the control signal, while assuming that the antenna port for the channel state information reference signal is quasi co-located (QCLed) with an antenna port for the user equipment-specific reference signal, wherein when the channel state information reference signal is an aperiodic channel state information reference signal, the user equipment does not expect that the control signal includes the information about the antenna port for the channel state information reference signal.

Preferably, the channel state information reference signal is a periodic channel state information reference signal and is transmitted a predetermined number of times or more. More preferably, the predetermined number of times is 1.

Further, the method further comprises receiving configuration information for the channel state information reference signal via a higher layer, wherein the configuration information does not include subframe configuration information for the channel state information reference signal, the channel state information reference signal is the aperiodic channel state information reference signal. In one embodiment, the method further comprises: when the configuration information includes the subframe configuration information for the channel state information reference signal, receiving information indicating activation or deactivation of the channel state information reference signal from the base station.

Furthermore, it is assumed that at least one of Doppler spread, Doppler shift, average delay, and delay spread is equal between with the antenna port for the user equipment-specific reference signal and the antenna port for the channel state information reference signal assumed to be quasi co-located (QCLed) with the antenna port for the user equipment-specific reference signal.

Technical Effect

According to an embodiment of the present disclosure, in the wireless communication system, the base station can more accurately and efficiently indicate the QCL information for the aperiodic CSI-RS to the user equipment.

It will be appreciated by persons skilled in the art that that the effects that can be achieved through the present invention are not limited to what has been particularly described hereinabove and other advantages of the present invention will be more clearly understood from the following detailed description.

DETAILED DESCRIPTIONS

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
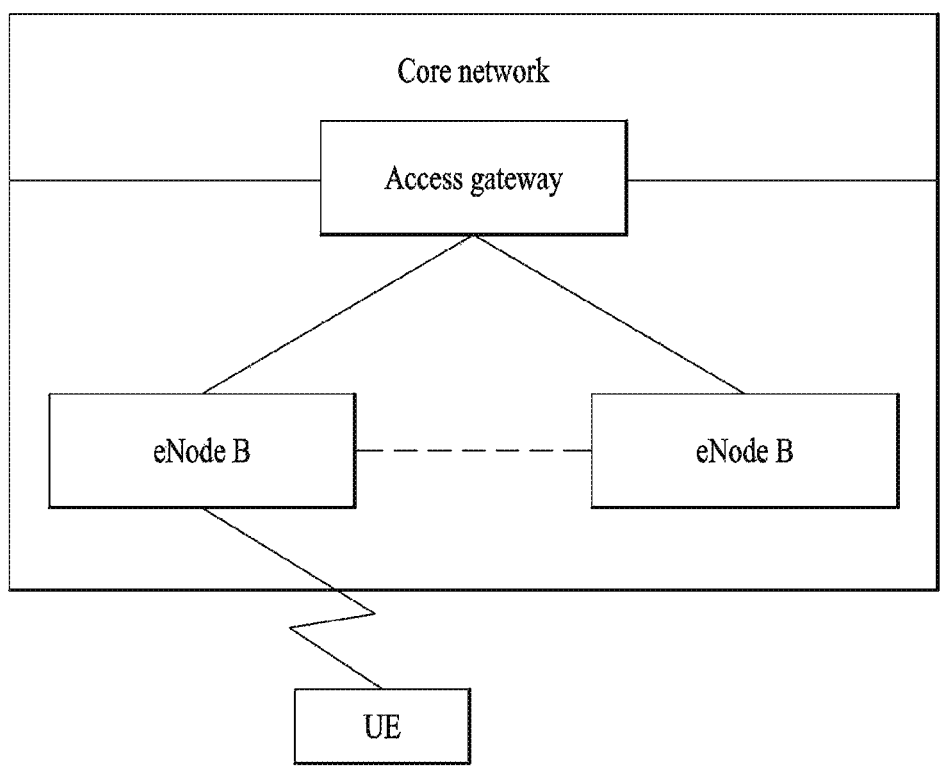
FIG. 1 illustrates a configuration of an Evolved Universal Mobile Telecommunications System (E-UMTS) network as an example of a wireless communication system.
Figure 2:
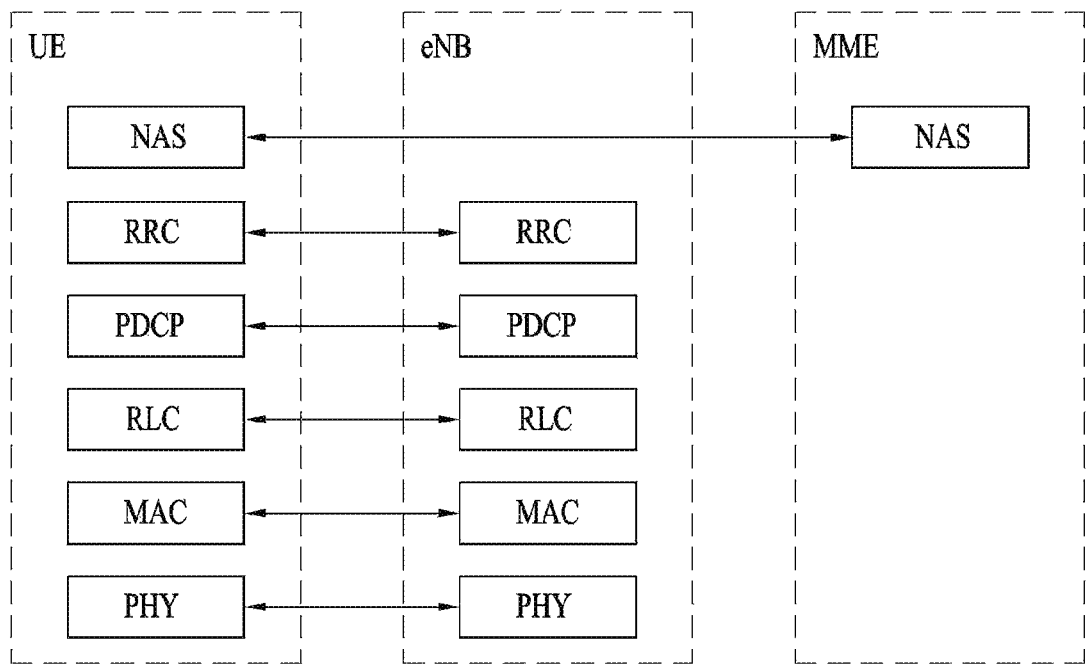
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).
Figure 2:
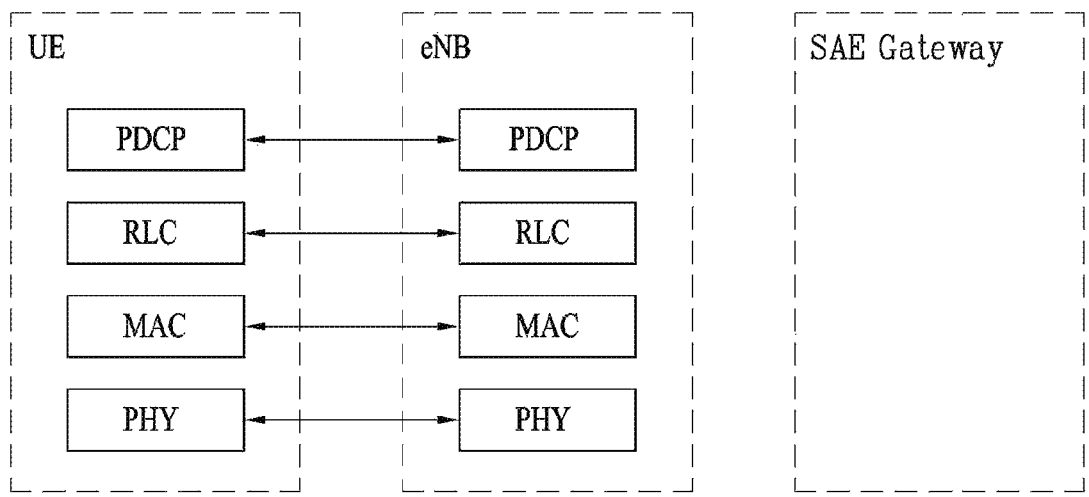

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
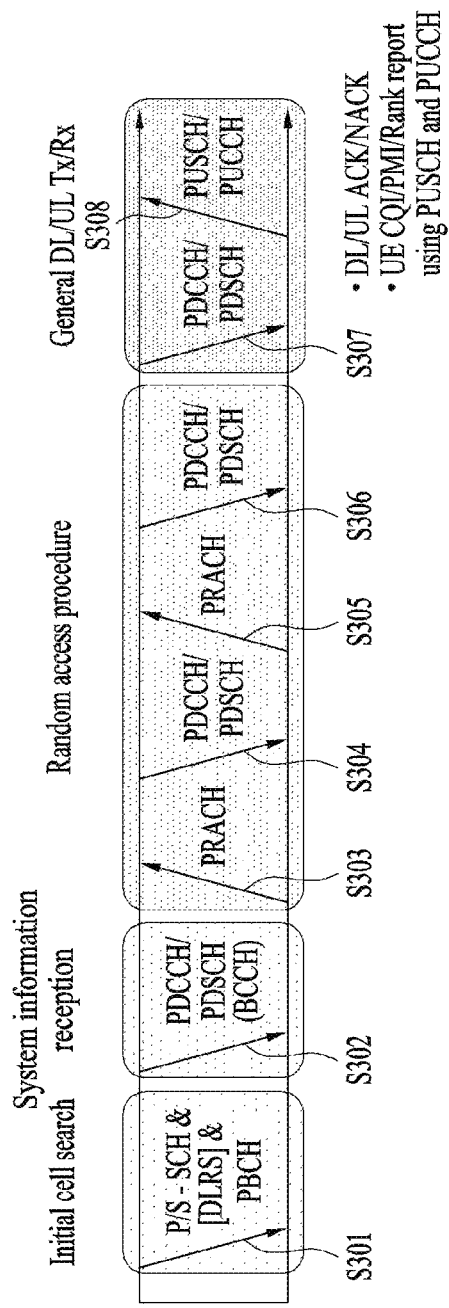
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
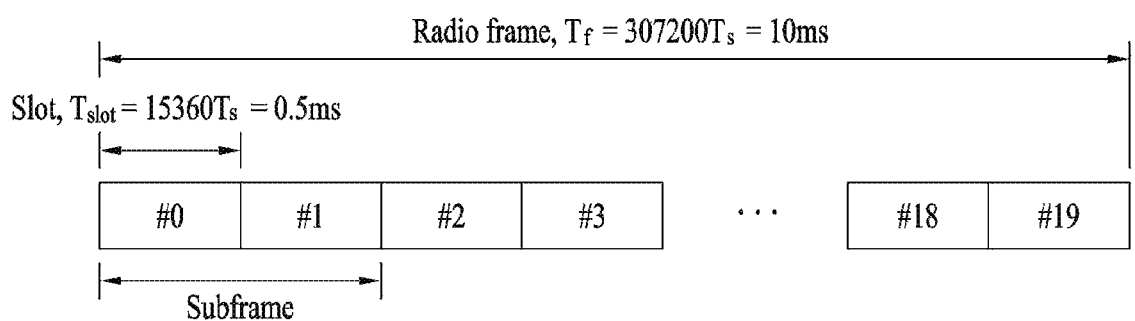
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s=1/(15\ \text{kHz}\times2048)=3.2552\times10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
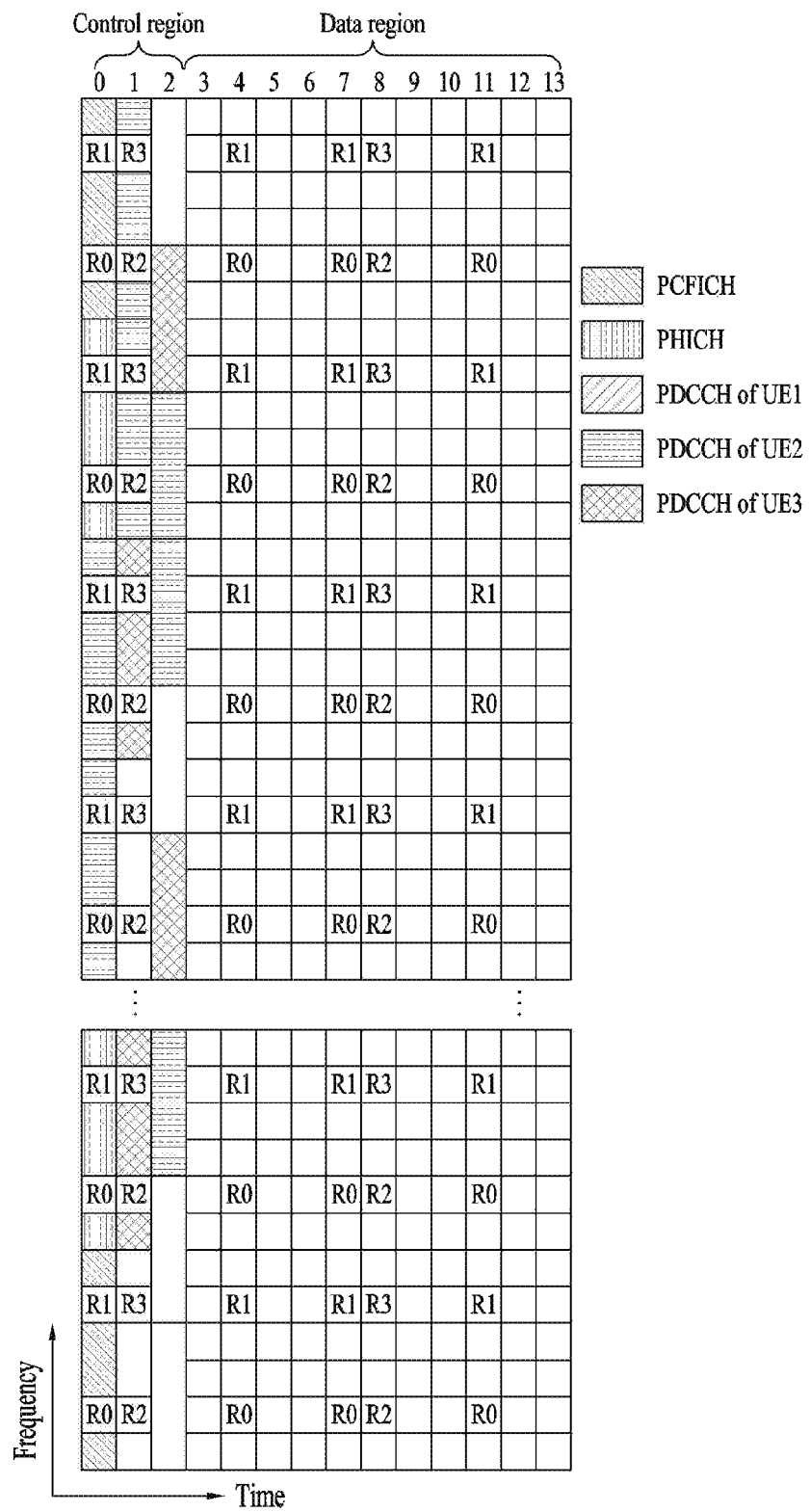
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
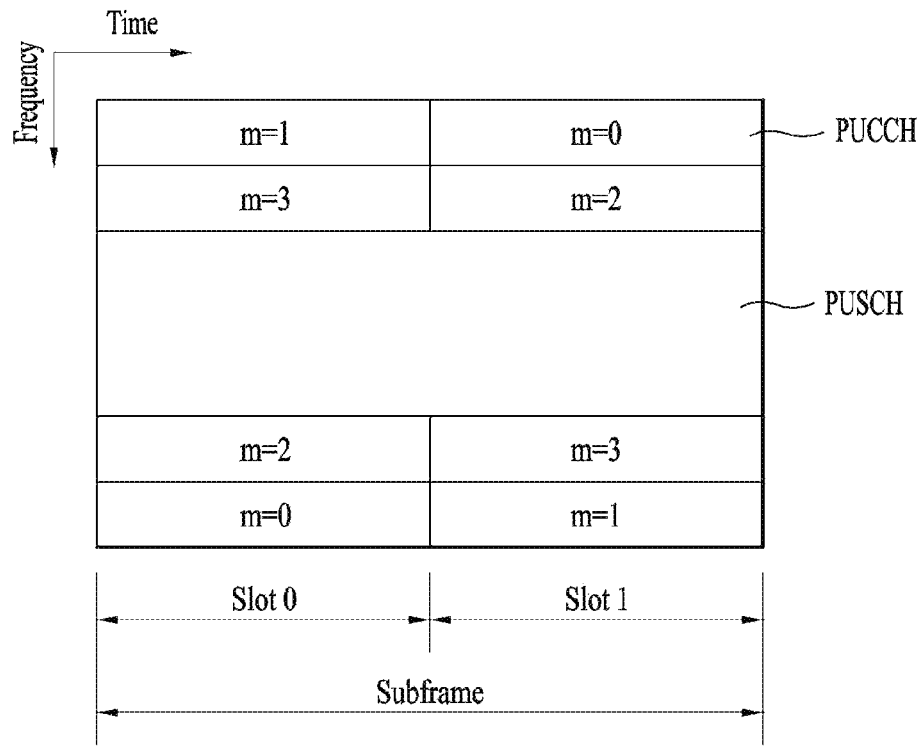
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
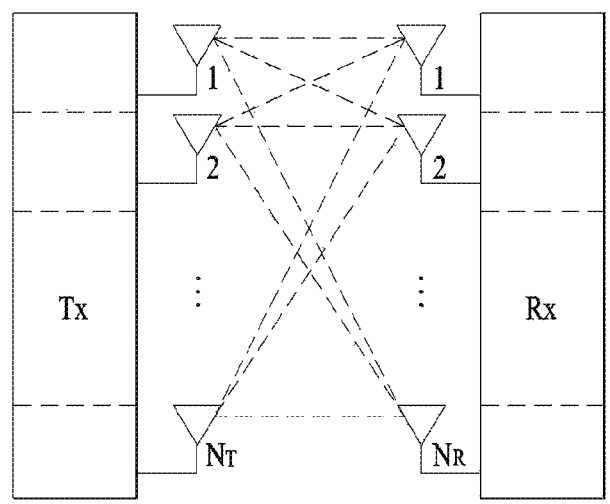
FIG. 7 is a schematic diagram of a typical multi-antenna (MIMO) communication system.

The configuration of a general MIMO communication system is shown in FIG. 7.

A transmitting end is equipped with $N_T$ transmission (Tx) antennas and a receiving end is equipped with $N_R$ reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where $R_i$ is the smaller of $N_T$ and $N_R$.

$$R_i = \min(N_T, N_R) \quad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2:

$$s = [s_1, s_2, \ldots, s_{N_T}]^T \quad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Hereinafter, the reference signal will be described in more detail.

In general, for the channel measurement, a reference signal already known to both the transmitting side and the receiving side is transmitted from the transmitting side to the receiving side together with the data. This reference signal informs the modulation technique as well as the channel measurement, thereby to allow performing the demodulation process. The reference signal is divided into a dedicated reference signal (DRS) to the base station and a specific user equipment, that is, a user equipment-specific reference signal, and a common reference signal (common RS or Cell-specific RS; CRS), which is a cell-specific reference signal for all user equipments in the specific cell. Further, the cell-specific reference signal includes a reference signal by which the UE measures CQI/PMI/RI and reports measurements to the base station. This reference signal may be referred to as CSI-RS (Channel State Information-RS).

The above-mentioned CSI-RS has been proposed for channel measurement for PDSCH separately from the CRS. Unlike the CRS, the CSI-RS may be defined using up to 32 different resource configurations to reduce inter-cell interference (ICI) in a multi-cell environment.

The CSI-RS (resource) configurations differ according to the number of antenna ports. The CSI-RS defined using a maximum number of different resource configurations is transmitted between adjacent cells. Unlike CRS, CSI-RS supports up to 8 antenna ports. In the 3GPP standards document, a total of eight antenna ports from antenna ports #15 to #22 are assigned to antenna ports for CSI-RS. Following Tables 1 and 2 show the CSI-RS configuration defined in the 3GPP standards document. Particularly, Table 1 relates to the case of Normal CP, while Table 2 shows the case of Extended CP.

TABLE 1

| | | Number of CSI reference signals configured | | | | | |
|---|---|---|---|---|---|---|---|
| | | 1 or 2 | | 4 | | 8 | |
| CSI reference signal configuration | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |

TABLE 1-continued

| | | Number of CSI reference signals configured | | | | | |
|---|---|---|---|---|---|---|---|
| CSI reference signal | | 1 or 2 | | 4 | | 8 | |
| configuration | | (k', l') | $n_s$ mod 2 | (k', l') | $n_s$ mod 2 | (k', l') | $n_s$ mod 2 |
| Frame structure type 2 only | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

In the above Table 1 and Table 2, (k',l') represents a RE index, k' represents a subcarrier index, l' represents a OFDM symbol index. FIG. 11 illustrates the CSI-RS configuration #0 in the case of the normal CP among the CSI-RS configurations defined in the current 3GPP standard document.

Further, a CSI-RS subframe configuration may be defined. The CSI-RS subframe configuration may be composed of a periodicity ($T_{CSI-RS}$) and a subframe offset ($\Delta_{CSI-RS}$) expressed in a subframe unit. Table 3 below shows the CSI-RS subframe configuration defined in the 3GPP standard document.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |

TABLE 3-continued

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 35-74 | 40 | $I_{CSI-RS}$ − 35 |
| 75-154 | 80 | $I_{CSI-RS}$ − 75 |

Currently, the information about the ZP (zero-power) CSI-RS is included in a form shown in Table 4 below into the CSI-RS-Config-r10 message and is transmitted via the RRC layer signal. In particular, the ZP CSI-RS resource configuration may be composed of zeroTxPowerSubframeConfig-r10 and zeroTxPowerResourceConfigList-r10, which is a 16-bit sized bitmap. Among them, the zeroTxPowerSubframeConfig-r10 informs, via a corresponding $I_{CSI-RS}$ value in Table 3, the periodicity and the subframe offset at which the corresponding ZP CSI-RS is transmitted. Further, the zeroTxPowerResourceConfigList-r10 may be information that informs the ZP CSI-RS configuration. Each element of the bitmap indicates configurations included in a column corresponding to four antenna ports for the CSI-RS in the above Table 1 or Table 2. That is, according to the 3GPP standard document, the ZP CSI-RS is defined only when there are four antenna ports for the CSI-RS.

TABLE 4

```
-- ASN1START
CSI-RS-Config-r10 ::=    SEQUENCE {
   csi-RS-r10              CHOICE {
   ...
   }
   zeroTxPowerCSI-RS-r10   CHOICE {
      release                 NULL,
      setup                   SEQUENCE {
         zeroTxPowerResourceConfigList-r10  BIT STRING (SIZE (16)),
         zeroTxPowerSubframeConfig-r10      INTEGER (0..154)
      }
   }
}
-- ASN1STOP
```

Now, a description of a Channel status information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI. Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

For reference, according to the current 3GPP standard document, the CQI index, the corresponding modulation order, and the coding rate are shown in Table 5 below.

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

In one example, the operation for calculating the CQI using the interference measurement is as follows.

The user equipment needs to calculate the SINR as a factor necessary for calculating the CQI. In this case, the UE may perform the reception power measurement (S-measure) of the desired signal using the RS such as NZP CSI-RS. For an interference power measurement (I-measure or Interference measurement), the UE measures the power of an interfering signal resulting from removal of the desired signal from the received signal.

The subframe sets $C_{CSI,0}$ and $C_{CSI,1}$ for CSI measurement may be configured via a higher layer signaling. The subframes corresponding to each of the subframe sets may not overlap with each other, but may be included in only one set. In such a case, the UE may perform the S-measure using RS such as CSI-RS without special subframe restrictions. However, in the case of I-measure, the UE individually performs the I-measure for each of subframe sets $C_{CSI,0}$ and $C_{CSI,1}$. Thus, the UE has to perform two different CQI calculations for the subframe sets $C_{CSI,0}$ and $C_{CSI,1}$.

Meanwhile, in the LTE-S system that is the standard of the next generation mobile communication system, it is expected to support CoMP (coordinated multi point) transmission scheme, which is not supported by the existing standard, for data transmission rate improvement. Here, the CoMP transmission scheme means a transmission scheme for two or more base stations or cells to communicate with a user equipment (UE) cooperatively to improve performance of communication between a UE in a radio shadow area and a base station (a cell or sector).

CoMP transmission schemes may be classified into CoMP-joint processing (CoMP-JP) of cooperative MIMO characterized by data sharing and CoMP-coordinated scheduling/beamforming (CoMP-CS/CB).

In DL CoMP-JP, a UE may instantaneously receive data simultaneously from base stations that perform CoMP transmission and may combine the received signals, thereby increasing reception performance (joint transmission (JT)). In addition, one of the base stations participating in CoMP transmission may transmit data to the UE at a specific time point (dynamic point selection (DPS)).

In contrast, in CoMP-CS/CB, a UE may receive data instantaneously from one base station, that is, a serving base station by beamforming.

In UL CoMP-JP, base stations may receive a PUSCH signal simultaneously from a UE (joint reception (JR)). In contrast, in CoMP-CS/CB, only one base station receives a PUSCH. Herein, cooperative cells (or base stations) may make a decision as to whether to use CoMP-CS/CB.

When the aforementioned CoMP scheme is applied, a UE may receive a multitude of CSI-RS configurations through RRC layer signaling. Each CSI-RS configuration is defined as Table 6. Referring to Table 6, it can be observed that information on a CRS capable of QCL (quasi co-location) assumption per CSI-RS configuration is included.

TABLE 6

| CSI-RS-ConfigNZP information elements |
| --- |
| -- ASN1START |
| CSI-RS-ConfigNZP-r11 ::=  SEQUENCE { |
|   csi-RS-ConfigNZPID-r11    CSI-RS-ConfigNZPId-r11, |
|   antennaPortsCount-r11     ENUMERATED {an1, an2, an4, an8}, |
|   resourceConfig-r11        INTEGER {0..31}, |
|   subframeConfig-r11        INTEGER {0..154}, |
|   scramblingIdentity-r11    INTEGER {0..503}, |
|   qcl-CRS-Info-r11          SEQUENCE { |
|     qcl-ScramblingIdentity-r11    INTEGER {0..503}, |
|     crs-PortsCount-r11            ENUMERATED {n1, n2, n4, spare1}, |
|     nbsfn-SubframeConfigList-r11  CHOICE { |
|       release                     NULL, |
|       setup                       SEQUENCE { |
|         subframeConfigList          MBSFN-SubframeConfigList |
|       } |
|     }                                                    OPTIONAL  -- Need ON |
|   }                                                        OPTIONAL,  -- Need CR |
| ... |
| } |
| -- ASN1STOP |

Meanwhile, in the recent 3GPP LTE-A standard, for transmission mode 10 that is a PDSCH transmission of CoMP, a PQI (PDSCH RE mapping and quasi-co-location indicator) field is defined in DCI format 2D. Particularly, the PQI field is defined in a 2-bit size and indicates total 4 states as Table 7. Information indicated by each state is a parameter set for receiving PDSCH of CoMP and specific values are signaled in advance through higher layers. Namely, for Table 7, total 4 parameter sets can be semi-statically signaled through RRC layer signals, and a PQI field of DCI format 2D indicates one of the total 4 parameter sets dynamically.

TABLE 7

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

Information included in the parameter set includes at least one of the number of CRS antenna ports [crs-PortsCount], a frequency shift value of CRS [crs-FreqShift], an MBSFN subframe configuration [mbsfn-SubframeConfigList], a ZP CSI-RS configuration [csi-RS-ConfigZPId], a PDSCH start symbol [pdsch-Start], and a QCL (Quasi Co-Location) information of NZP (Non-ZP) CSI-RS [qcl-CSI-RS-ConfigNZ-PId].

In the following, QCL (Quasi Co-Location) between antenna ports is explained.

QCL between antenna ports indicates that all or a part of large-scale properties of a signal (or a radio channel corresponding to a corresponding antenna port) received by a user equipment from a single antenna port may be identical to large-scale properties of a signal (or a radio channel corresponding to a corresponding antenna port) received from a different single antenna port. In this case, the larger-scale properties may include Doppler spread related to frequency offset, Doppler shift, average delay related to timing offset, delay spread and the like. Moreover, the larger-scale properties may include average gain as well.

According to the aforementioned definition, a user equipment cannot assume that the large-scale properties are identical to each other between antenna ports not in the QCL, i.e., NQCL (Non Quasi co-located) antenna ports. In this case, the user equipment should independently perform a tracking procedure to obtain frequency offset, timing offset and the like according to an antenna port.

On the contrary, the user equipment can perform following operations between antenna ports in QCL.

1) The user equipment can identically apply power-delay profile for a radio channel corresponding to a specific antenna port, delay spread, Doppler spectrum and Doppler spread estimation result to a Wiener filter parameter, which is used for estimating a channel for a radio channel corresponding to a different antenna port, and the like.

2) After obtaining time synchronization and frequency synchronization for the specific antenna port, the user equipment can apply identical synchronization to a different antenna port as well.

3) The user equipment can calculate an average value of RSRP (reference signal received power) measurement values of each of the antenna ports in QCL to obtain average gain.

For instance, having received DM-RS based downlink data channel scheduling information (e.g., DCI format 2C) via PDCCH (or E-PDCCH), the user equipment performs channel estimation for PDSCH via a DM-RS sequence indicated by the scheduling information and may be then able to perform data demodulation.

In this case, if a DM-RS antenna port used for demodulating a downlink data channel and a CRS antenna port of a serving cell are in QCL, when the user equipment performs a channel estimation via the DM-RS antenna port, the user equipment can enhance reception capability of the DM-RS based downlink data channel in a manner of applying large-scale properties of a radio channel estimated from a CRS antenna port of the user equipment as it is.

Similarly, if a DM-RS antenna port used for demodulating a downlink data channel and a CSI-RS antenna port of a serving cell are in QCL, when the user equipment perform a channel estimation via the DM-RS antenna port, the user equipment can enhance reception capability of the DM-RS based downlink data channel in a manner of applying large-scale properties of a radio channel estimated from a CSI-RS antenna port of the serving cell as it is.

Meanwhile, in the LTE system, when a DL signal is transmitted in transmission mode 10 that is a CoMP mode, it is defined that a base station configures one of QCL type A and QCL type B for a UE through a higher layer signal.

Here, the QCL type A assumes that antenna ports of CRS, DM-RS and CSI-RS quasi co-located in the rest of large-scale properties except an average gain and means that physical channel and signals are transmitted from the same node (point). On the other hand, regarding the QCL type B, maximum 4 QCL modes per UE are configured through a higher layer message to enable CoMP transmission such as DPS, JT and the like. And, which one of the 4 QCL modes is used to receive a DL signal is defined to be configured through DCI (downlink control information) dynamically.

DPS transmission in case of setting QCL type B is described in detail as follows.

First of all, a node #1 configured with $N_1$ antenna ports is assumed as transmitting CSI-RS resource #1, and a node #2 configured with $N_2$ antenna ports is assumed as transmitting CSI-RS resource #2. In this case, the CSI-RS resource #1 is included in parameter set #1 and the CSI-RS resource #2 is included in parameter set #2. Moreover, a base station configures the parameter set #1 and the parameter set #2 for a UE existing within a common coverage of the node #1 and the node #2 through a higher layer signal.

Thereafter, DPS can be performed in a manner that the base station configures the parameter set #1 for the corresponding UE using DCI in case of data (i.e., PDSCH) transmission through the node #1 and configures the parameter set #2 in case of data transmission through the node #2. In aspect of the UE, if the parameter set #1 is configured through DCI, it can assume that CSI-RS resource #1 and DM-RS are quasi co-located. If the parameter set #2 is configured through DCI, it can assume that CSI-RS resource #2 and DM-RS are quasi co-located.

Recently, active research on the introduction of Active Antenna System (AAS) is under way in the next generation mobile communication. In the AAS, each antenna is composed of an active antenna including an active circuit. Thus, varying the antenna pattern depending on the situation may allow reducing interference or performing beamforming efficiently.

When such an AAS is constructed in two dimensions, that is, when 2D-AAS is implemented, it is possible to more aggressively change the transmission beam according to the position of the receiving end by adjusting the main lobe of the antenna three-dimensionally more efficiently in terms of antenna patterns.

Figure 8:
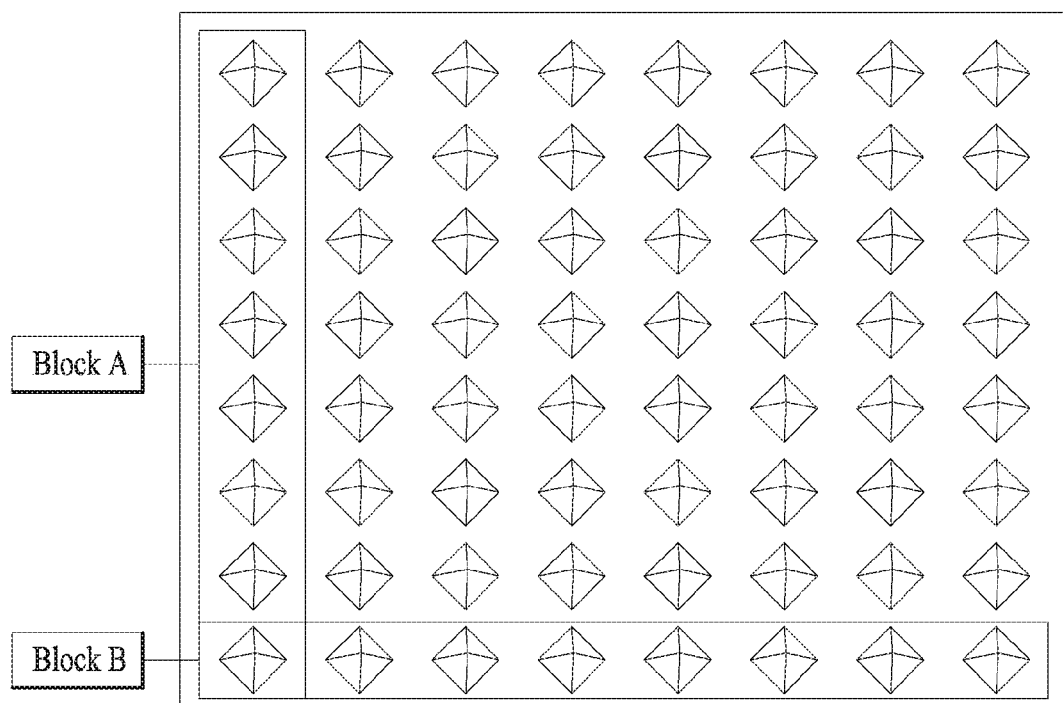
FIG. 8 shows an implementation of 2D-AAS.

FIG. 8 shows an implementation of 2D-AAS. Specifically, in FIG. 8, it is assumed that the antenna array is a co-polarized antenna array with each antenna element having the same polarization. Referring to FIG. 8, in the 2D-AAS, the antennas are arranged in the vertical and horizontal directions, and, thus, a system of multiple antennas can be constructed.

In a full dimension (FD)-MIMO system using the 2D-AAS, the base station may configure several CSI-RS resources in one CSI process for the UE. In this connection, the CSI process refers to an operation of feedbacking channel information using an independent feedback configuration.

In this case, the UE does not regard the CSI-RS resources configured in the single CSI process as an independent channel. Rather, the UE aggregates the resources and thus assumes a single large CSI-RS resource. Then, the UE computes and feeds back CSI from these resources. For example, the base station may configure three 4-port CSI-RS resources in a single CSI process for the UE. The UE aggregates these resources and thus assumes a single 12-port CSI-RS resource. The UE calculates and feeds back the CSI using the 12-port PMI from this CSI-RS resource. This reporting mode may be referred to as Class A CSI reporting in the LTE-A system.

Alternatively, the UE may assume that each CSI-RS resource is an independent channel. The UE selects one of the CSI-RS resources and calculates and reports the CSI based on the selected resource. That is, the UE selects a CSI-RS with the strongest channel among the eight CSI-RSs. Then, the UE calculates the CSI based on the selected CSI-RS and reports the calculated CSI to the base station. In this regard, the UE reports the selected CSI-RS to the base station via the CSI-RS Resource Indicator (CRI). For example, if the channel of the first CSI-RS corresponding to T (0) is strongest, the UE configures CRI=0 and reports the same to the base station. This reporting mode may be referred to as Class B CSI reporting in the LTE-A system.

To effectively demonstrate this feature, in the class B, the following variables may be defined for the CSI process. K is the number of CSI-RS resources in the CSI process. $N_k$ denotes the number of CSI-RS ports of the k-th CSI-RS resource.

Recently, in 3GPP standardization, in addition to a periodic NZP (Nonzero Power) CSI-RS (Periodic CSI-RS; P CSI-RS) transmitted based on the period and offset as shown in Table 3, an aperiodic NZP CSI-RS (Aperiodic CSI-RS; AP CSI-RS) has been introduced. In particular, the AP CSI-RS differs from the P CSI-RS in that only one transmission thereof is performed at a specific point in time. Hereinafter, "NZP" is omitted. Unless "ZP" (zero power) is specified, the CSI-RS means the NZP CSI-RS.

More specifically, multiple CSI-RS resources may be configured in a single CSI process via RRC layer signaling as an upper layer signaling. In this connection, several CSI-RS resources may be composed of only P CSI-RS or alternatively may be composed only of AP CSI-RS. Alternatively, multiple CSI-RS resources may be configured as a combination of P CSI-RS and AP CSI-RS.

As described above, in the CoMP system, it may be assumed that the DM-RS and CSI-RS specified by the PQI using the QCL type B are quasi co-located with each other in terms of Doppler spread, Doppler shift, average delay and delay spread. It may be assumed that the CSI-RS and the CRS connected thereto via RRC signaling are quasi co-located in terms of Doppler spread and Doppler shift. If the CSI-RS quasi co-located with the DM-RS is configured as an AP CSI-RS, the QCL between AP CSI-RS and DM-RS cannot be assumed. This is because of following: the AP CSI-RS does not exist in a periodic manner in multiple subframes but exists in one subframe in a singe manner, and, thus, the large-scale properties including Doppler spread, Doppler shift, average delay and delay spread cannot be deduced from the AP CSI-RS.

Therefore, the UE does not expect the base station to indicate the QCL type B between the AP CSI-RS and the DM-RS via the PQI. That is, the base station does not indicate the QCL type B between the AP CSI-RS and DM-RS via the PQI.

Alternatively, when the QCL type B between the AP CSI-RS and the DM-RS is indicated to the UE via the PQI, the UE ignores the QCL type B between the AP CSI-RS and the DM-RS. The UE assumes from the CRS associated with the AP CSI-RS that the DM-RS and the CRS are quasi co-located in terms of Doppler spread, Doppler shift, average delay and delay spread. In this case, the CRS associated with the AP CSI-RS is a signal that the base station has previously informed the UE via RRC signaling.

However, regarding the average delay and delay spread, the QCL relationship between the DM-RS and CRS may be inferred from the AP CSI-RS that exists on a subframe in a single manner. This is because of the following reasons: AP CSI-RS is in the full band, and, thus, using the AP CSI-RS in the full band, the average delay and delay spread properties can be computed with high accuracy. Therefore, when the UE receives an indication of the QCL between the AP CSI-RS and the DM-RS via the PQI, the UE operates as follows. The UE assumes that the AP CSI-RS and DM-RS are QCLed with respect to the average delay, and delay spread. The UE assumes from the CRS associated with AP CSI-RS that the DM-RS and CRS are QCLed with respect to Doppler shift, Doppler spread. The CRS associated with the AP CSI-RS is the signal that the base station previously informed the UE via RRC signaling. The QCL is defined as a QCL type C and is distinguished from the QCL types A and B.

According to the current 3GPP standard, below TM9 inclusive, that is, in a non-CoMP transmission, the QCL type A (following a below definition) is applied. When, in TM9, AP CSI-RS is used, the antenna ports of the CRS, DM-RS, and periodic CSI-RS (hereinafter, P CSI-RS) may not share large scale properties.

Therefore, the QCL type A may be modified as follows: it is assumed that except for AP CSI-RS antenna ports, antennal ports of CRS, DM-RS, and P CSI-RS are quasi co-located (QCLed) with respect to the delay spread, Doppler spread, Doppler shift, and average delay.

Alternatively, the QCL type A may be modified as follows: it is assumed that the antenna ports of the CRS, DMRS, and Periodic CSI-RS are quasi co-located with respect to delay spread, Doppler spread, Doppler shift, and average delay; and it is assumed that the AP CSI-RS antenna ports and the remaining CRS, DM-RS, and P CSI-RS antenna ports are quasi co-located (QCLed) only with respect to delay spread and average delay.

In recent 3GPP standardization, in addition to introduction of AP CSI-RS, introduction of multi-shot CSI-RS has been made. For the multi-shot CSI-RS, the P CSI-RS transmission may be activated or deactivated via predetermined signaling. When a CSI-RS that was in a deactivated state for a predetermined period (e.g., for a few hundred subframes) has been activated in a subframe #n and, at the same time, data transmission to the UE corresponding is performed on the subframe #n, there may occur a problem in the QCL (quasi co-location) between the AP CSI-RS and the DM-RS described above. This is because the most recently received valid CSI-RS exists only on the subframe #n, and the large-scale properties of the channel cannot be calculated correctly using the CSI-RS measured on one subframe.

Therefore, the base station should be configured such that the CSI-RS is transmitted several times (for example, L times) over a sufficient number of subframes after the multi-shot CSI-RS is activated, and thereafter, the CSI-RS and the DMRS are QCLed. That is, for the multi-shot CSI-RS in which the CSI-RS is not transmitted several times (e.g., L times) over a sufficient number of subframes after the multi-shot CSI-RS is activated, the UE does not expect the base station to indicate the QCL between the DM-RS and the CSI-RS as not transmitted. In other words, for the multi-shot CSI-RS in which the CSI-RS is not transmitted several times (e.g., L times) over a sufficient number of subframes after the multi-shot CSI-RS is activated, the base station may not indicate the QCL between the DM-RS and the CSI-RS as not transmitted.

In this connection, the UE may report the L value to the base station as UE capability. Alternatively, the base station may inform the UE of the L value. Alternatively, the L value may be predefined as a fixed value. For example, L may be 1. In this case, for a multi-shot CSI-RS which has been deactivated and then activated but in which a single CSI-RS transmission is not performed, the UE may not expect the base station to indicate an QCL between the DM-RS and the corresponding multi-shot CSI-RS. In other words, for a multi-shot CSI-RS which has been deactivated and then activated but in which a single CSI-RS transmission is not performed, the base station may not indicate an QCL between the DM-RS and the corresponding multi-shot CSI-RS.

Alternatively, it may be determined based on the L value whether (i) the CSI-RS indicated to be QCLed with the DM-RS is utilized as QCL type B or (ii) the CSI-RS is not utilized and it is assumed that DM-RS and CRS as connected to the CSI-RS in the QCLed relationship are QCLed with respect to delay spread and average delay.

For example, when a CSI-RS is transmitted several times (e.g., L times) over a sufficient number of subframes after the QCL-indicated multi-shot CSI-RS is turned on, the UE assumes the QCL type B as in the conventional method. Otherwise, the UE does not utilize the CSI-RS and the UE assumes that DM-RS and CRS connected to the CSI-RS in the QCLed relationship are QCLed with respect to delay spread and average delay. Briefly, regardless of the L value, the UE does not utilize the QCL-indicated CSI-RS and the UE assumes that DM-RS and CRS connected to the CSI-RS in the QCLed relationship are QCLed with respect to delay spread and average delay.

Additionally, in the CoMP mode (that is, in TM10), AP CSI-RS may be configured for an UE (an UE configured with a single CSI process for each carrier when a carrier aggregation technique is applied) configured with the QCL Type B and a single CSI process. However, in this case, in accordance with the present disclosure, UE may not expect that the AP CSI-RS is configured in the PQI field for the purpose of being QCLed with DM-RS. More specifically, it is apparent that the AP CSI-RS may be configured for the UE that has been configured with the QCL type A. However, as this approach is limited to a single CSI process, the AP CSI-RS may not be configured in a CoMP operation such as a DPS in which multiple CSI processes need to be configured for a single UE. This is because of the following reasons: in the CoMP operation, using P NZP CSI-RS may allow the sufficient capability to be obtained, and implementation complexity which may result from operating the CoMP and AP CSI-RS together may be reduced. In a distributed antenna environment, when the cell split gain is obtained, a single CSI process may be still configured for the UE, and, therefore, AP CSI-RS may still be used in this environment.

Additionally, in the CoMP mode (that is, in TM10), multi shot CSI-RS (configured to be activated/deactivated or NZP CSI-RS configured to be activated/deactivated) may be configured for an UE (an UE configured with a single CSI process for each carrier when a carrier aggregation (CA) technique is applied) configured with the QCL Type B and a single CSI process. In this case, in accordance with the present disclosure, the multi-shot CSI-RS may be configured for the purpose of being quasi-co-located with the DM-RS in the PQI field and the multi-shot CSI-RS may comply with the existing QCL definition.

However, the UE may not expect that the multi-shot CSI-RS within a predetermined time (for example, X ms) after the activation of the multi-shot CSI-RS is configured for the purpose of being quasi co-located with the DM-RS in the PQI field.

Specifically, it is apparent that the multi-shot CSI-RS may be configured for the UE that has been configured with the QCL type A. However, as this approach is limited to a single CSI process, the multi-shot CSI-RS may not be configured in a CoMP operation such as a DPS in which multiple CSI processes need to be configured for a single UE. This is because of the following reasons: in the CoMP operation, using P NZP CSI-RS may allow the sufficient capability to be obtained, and implementation complexity which may result from operating the CoMP and multi-shot CSI-RS together may be reduced. In a distributed antenna environment, when the cell split gain is obtained, a single CSI process may be still configured for the UE, and, therefore, the multi-shot CSI-RS may still be used in this environment.

Additionally, when the UE performs channel estimation for CSI computing from the AP CSI-RS/multi shot CSI-RS, the UE may use the large scale channel properties including Doppler shift, Doppler spread, average delay, and delay spread from the CRS. The AP CSI-RS/multi shot CSI-RS, unlike the conventional CSI-RS, has a small number of sampling of a CSI-RS on the time axis. Thus, it is clear that Doppler shift and Doppler spread computed from CRS may be used for the channel estimation of the AP CSI-RS/multi shot CSI-RS. In addition, it is proposed that the average delay and delay spread computed from the CRS are used for the channel estimation of the AP CSI-RS/multi shot CSI-RS.

As described above, the AP CRI-RS/multi-shot CSI-RS cannot be configured for the purpose of being QCLed in the PQI field. In this case, at least one P CSI-RS configured for being QCLed with the DM-RS must be configured for the UE. The P CSI-RS configured for being QCLed with the DM-RS should be indicated in the PQI field. When the UE performs channel estimation for CSI computing from the AP CSI-RS/multi-shot CSI-RS using the P CSI-RS, the large scale channel properties such as Doppler shift, Doppler spread, average delay, and delay spread from the P CSI-RS may be used.

The AP CSI-RS/multi-shot CSI-RS, unlike the conventional CSI-RS, has a small number of sampling of a CSI-RS on the time axis. Thus, it is clear that Doppler shift and Doppler spread computed from the P CRI-RS may be used for the channel estimation of the AP CSI-RS/multi-shot CSI-RS. As an alternative, it is proposed that the average delay and delay spread computed from the P CRI-RS may be used for the channel estimation of the AP CSI-RS/multi-shot CSI-RS. When multiple P CSI-RSs are configured for the UE, an arbitrary P CSI-RS among the plurality of P CSI-RSs may be used or the lowest indexed P CSI-RS may also be used. Alternatively, when multiple P CSI-RSs are configured for the UE, any P CSI-RS among P CSI-RSs configured to be QCLed with DM-RS in the PQI field may be used, or the lowest indexed P CSI-RS among the P CSI-RSs configured to be QCLed with DM-RS in the PQI field. Alternatively, the P CSI-RS defined in PQI State 00 may also be used.

Figure 9:
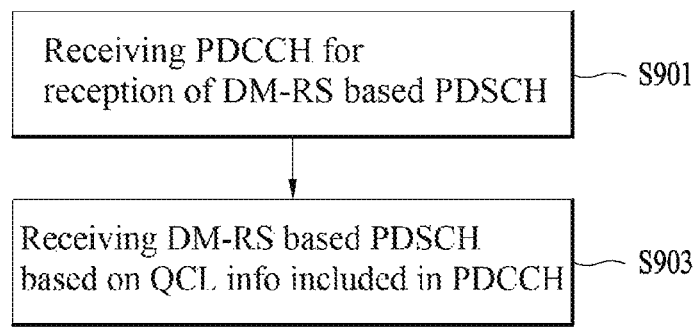
FIG. 9 is a flowchart illustrating a method for indicating QCL information for an aperiodic CSI-RS according to an embodiment of the present disclosure.

FIG. 9 is a flowchart illustrating a method for indicating quasi co-location (QCL) information for an aperiodic CSI-RS according to an embodiment of the present disclosure.

Referring to FIG. 9, in operation 901, the user equipment receives a PDCCH for reception of a DM-RS-based PDSCH from a base station. In this regard, the PDCCH may be preferably for TM 10 and may include, for example, DCI format 1A or DCI format 2D.

Next, the user equipment, at operation 90, receives the DM-RS-based PDSCH based on quasi co-location (QCL) information included in the PDCCH, more specifically, based on information about an CSI-RS antenna port which is assumed to be quasi co-located (QCLed) with a DM-RS antenna port. It may be assumed that at least one of the Doppler spread, Doppler shift, average delay, and delay spread may be same between the DM-RS antenna port and the CSI-RS antenna port which is assumed to be quasi co-located (QCLed) with a DM-RS antenna port. In particular, in accordance with the present disclosure, the CSI-RS excludes aperiodic CSI-RS.

Although not shown in the figure, the user equipment receives configuration information for the CSI-RS via a higher layer. When the configuration information does not include subframe configuration information for the CSI-RS, the CSI-RS means the aperiodic CSI-RS.

Even when the configuration information includes the subframe configuration information for the channel state information reference signal, the UE may receive, from the base station, information indicating activation or deactivation of the channel state information reference signal. In this case, although the CSI-RS, which may be assumed to be quasi co-located (QCLed) with the DM-RS is a periodic CSI-RS, the CSI-RS may be transmitted a predetermined number of times or more. The predetermined number of times may be 1.

Figure 10:
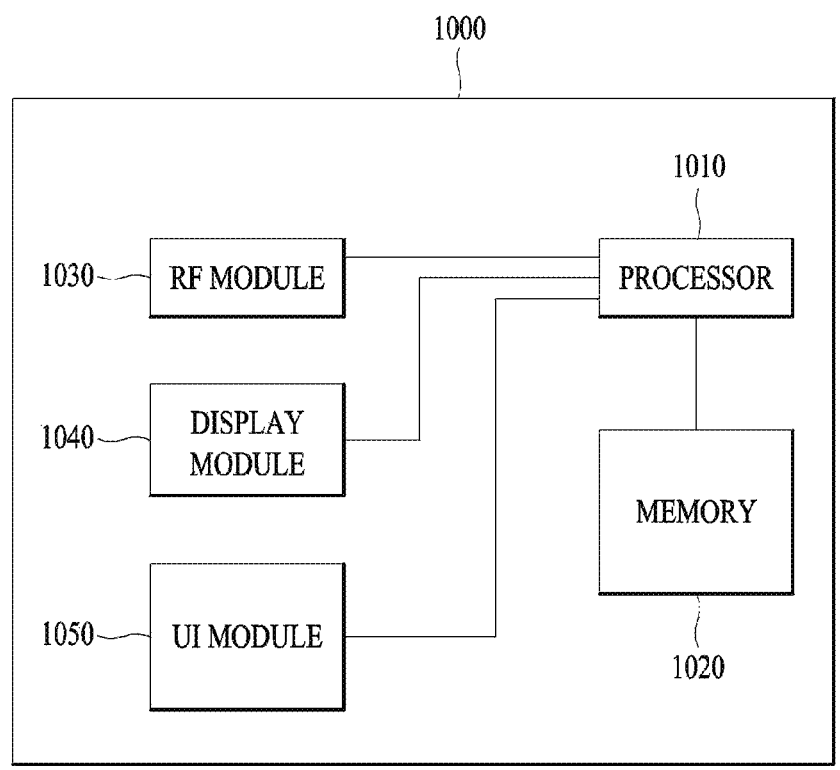
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, an RF module 1030, a display module 1040, and a User Interface (UI) module 1050.

The communication device 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present invention described before with reference to the drawings. Specifically, for detailed operations of the processor 1010, the descriptions of FIGS. 1 to 9 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a Liquid Crystal Display (LCD), a Light Emitting Diode (LED) display, and an Organic Light Emitting Diode (OLED) display. The UI module 1050 is connected to the processor 1010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method and device for indicating quasi co-location (QCL) information for an aperiodic CSI-RS in a wireless communication system as described above are exemplified mainly with reference to 3GPP LTE system. However, the method and the device may be applied to various wireless communication systems other than the 3GPP LTE system.

What is claimed is:

1. A method for receiving a user equipment-specific reference signal-based data signal by a user equipment in a wireless communication system, the method comprising:
   receiving a control signal for the user equipment-specific reference signal-based data signal from a base station; and
   receiving the user equipment-specific reference signal-based data signal based on the control signal,
   wherein the control signal includes information about an antenna port for a channel state information reference signal assumed to be quasi co-located (QCLed) with an antenna port for the user equipment-specific reference signal,
   wherein the channel state information reference signal excludes an aperiodic channel state information reference signal.

2. The method of claim 1, wherein the channel state information reference signal is a periodic channel state information reference signal and is transmitted a predetermined number of times or more.

3. The method of claim 2, wherein the predetermined number of times is 1.

4. The method of claim 1, wherein the method further comprises receiving configuration information for the channel state information reference signal via a higher layer,
   wherein the configuration information does not include subframe configuration information for the channel state information reference signal, the channel state information reference signal is the aperiodic channel state information reference signal.

5. The method of claim 4, wherein the method further comprises:
   when the configuration information includes the subframe configuration information for the channel state information reference signal,
   receiving information indicating activation or deactivation of the channel state information reference signal from the base station.

6. The method of claim 1, wherein it is assumed that at least one of Doppler spread, Doppler shift, average delay, and delay spread is equal between with the antenna port for the user equipment-specific reference signal and the antenna port for the channel state information reference signal assumed to be quasi co-located (QCLed) with the antenna port for the user equipment-specific reference signal.

7. A user equipment (UE) in a wireless communication system, the UE comprising:
   a wireless communication module; and
   a processor coupled to the module, wherein the processor is configured for:
   receiving a control signal for the user equipment-specific reference signal-based data signal from a base station; and
   receiving the user equipment-specific reference signal-based data signal based on the control signal,
   wherein the control signal includes information about an antenna port for a channel state information reference signal assumed to be quasi co-located (QCLed) with an antenna port for the user equipment-specific reference signal,
   wherein the channel state information reference signal excludes an aperiodic channel state information reference signal.

8. The UE of claim 7, wherein the channel state information reference signal is a periodic channel state information reference signal and is transmitted a predetermined number of times or more.

9. The UE of claim 8, wherein the predetermined number of times is 1.

10. The UE of claim 7, wherein the processor is further configured for receiving configuration information for the channel state information reference signal via a higher layer, wherein the configuration information does not include subframe configuration information for the channel state information reference signal, the channel state information reference signal is the aperiodic channel state information reference signal.

11. The UE of claim 10, wherein the processor is further configured for:
when the configuration information includes the subframe configuration information for the channel state information reference signal,
receiving information indicating activation or deactivation of the channel state information reference signal from the base station.

12. The UE of claim 10, wherein it is assumed that at least one of Doppler spread, Doppler shift, average delay, and delay spread is equal between with the antenna port for the user equipment-specific reference signal and the antenna port for the channel state information reference signal assumed to be quasi co-located (QCLed) with the antenna port for the user equipment-specific reference signal.

13. A method for receiving a user equipment-specific reference signal-based data signal by a user equipment in a wireless communication system, the method comprising:
receiving a control signal for the user equipment-specific reference signal-based data signal from a base station, wherein the control signal includes information about an antenna port for a channel state information reference signal; and
receiving the user equipment-specific reference signal-based data signal based on the control signal, while assuming that the antenna port for the channel state information reference signal is quasi co-located (QCLed) with an antenna port for the user equipment-specific reference signal,
wherein when the channel state information reference signal is an aperiodic channel state information reference signal, the user equipment does not expect that the control signal includes the information about the antenna port for the channel state information reference signal.

14. The method of claim 13, wherein the channel state information reference signal is a periodic channel state information reference signal and is transmitted a predetermined number of times or more.

15. The method of claim 14, wherein the predetermined number of times is 1.

16. The method of claim 13, wherein the method further comprises receiving configuration information for the channel state information reference signal via a higher layer, wherein the configuration information does not include subframe configuration information for the channel state information reference signal, the channel state information reference signal is the aperiodic channel state information reference signal.

* * * * *